US009343122B2

(12) United States Patent
Lewis et al.

(10) Patent No.: US 9,343,122 B2
(45) Date of Patent: May 17, 2016

(54) CIRCUIT CONFIGURATION FOR SELECTING AND OUTPUTTING DIGITAL INPUT DATA AND OPERATING METHOD FOR SAME

(71) Applicants: Matthew Lewis, Reutlingen (DE); Paulius Duplys, Markgroeningen (DE)

(72) Inventors: Matthew Lewis, Reutlingen (DE); Paulius Duplys, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/326,199

(22) Filed: Jul. 8, 2014

(65) Prior Publication Data

US 2015/0016193 A1 Jan. 15, 2015

(30) Foreign Application Priority Data

Jul. 10, 2013 (DE) .......................... 10 2013 213 473

(51) Int. Cl.
*G11C 7/10* (2006.01)
*G06F 21/79* (2013.01)
(52) U.S. Cl.
CPC .............. *G11C 7/1036* (2013.01); *G06F 21/79* (2013.01); *G06F 2221/2141* (2013.01)

(58) Field of Classification Search
CPC ................. G11C 7/1036; G06F 21/79; G06F 2221/2141; G06F 2221/2107
See application file for complete search history.

(56) References Cited

U.S. PATENT DOCUMENTS

| 6,337,830 | B1* | 1/2002 | Faue ......................... 365/230.04 |
| 6,477,107 | B1* | 11/2002 | Lee ........................... 365/233.18 |
| 6,512,719 | B2* | 1/2003 | Fujisawa et al. .......... 365/189.15 |
| 6,813,696 | B2* | 11/2004 | Kanda et al. .................... 711/167 |
| 7,499,368 | B2* | 3/2009 | Rao et al. .................... 365/233.1 |
| 8,243,543 | B2* | 8/2012 | Shin et al. ...................... 365/219 |
| 2004/0098551 | A1* | 5/2004 | Heo et al. ....................... 711/167 |
| 2004/0257881 | A1* | 12/2004 | Cho .......................... 365/189.05 |

* cited by examiner

*Primary Examiner* — John H. Hur
(74) *Attorney, Agent, or Firm* — Norton Rose Fulbright US LLP

(57) ABSTRACT

A circuit configuration includes a first input for inputting a first set of digital input data, an output for outputting digital output data, and a control input for receiving a control signal. At least two register units are provided and the circuit configuration is designed to write, as a function of the control signal, into a first register unit optionally at least a part of the first set of input data or of the second set of digital input data and to write into a second register unit optionally at least a part of the first set of input data or of the second set of input data.

15 Claims, 3 Drawing Sheets

CIRCUIT CONFIGURATION FOR SELECTING AND OUTPUTTING DIGITAL INPUT DATA AND OPERATING METHOD FOR SAME

FIELD OF THE INVENTION

The present invention relates to a circuit configuration including a first input for inputting a first set of digital input data, an output for outputting digital output data, and a control input for receiving a control signal. A circuit configuration of the type mentioned above is known in the form of a shift register, for example.

The present invention furthermore relates to an operating method for a circuit configuration of the type mentioned above.

SUMMARY

It is an object of the present invention to improve a circuit configuration and an operating method for a circuit configuration in such a way that an increased protection is achieved against cryptographic attacks, in particular against DPA (differential power analysis) attacks.

This object is achieved according to the present invention with the circuit configuration of the type mentioned at the outset in that at least two register units are provided and in that the circuit configuration is designed to write, as a function of the control signal, a) into a first register unit optionally at least a part of the first set of input data or of a second set of digital input data and to write b) into a second register unit optionally at least a part of the first set of input data or of the second set of input data.

By using two register units into which different data may be optionally written, a complex energy and emission signature of electromagnetic waves of the circuit configuration is advantageously achieved, so that an analysis of the power consumption and/or of electromagnetic emissions does not allow for direct conclusions regarding the processed (i.e., written) data. In one specific embodiment, the register units are essentially constructed in the same manner and are physically situated directly next to each other, which is particularly advantageous.

The circuit configuration according to the present invention may be used—analogously to a conventional memory register or shift register—for buffering digital data words of an arbitrary data width and the like, for example, and is suitable, in particular, for integration into cryptographic systems which must meet high requirements with regard to DPA hardening.

In one advantageous specific embodiment, it is provided that the circuit configuration has a second input for inputting the second set of digital input data. These data may be stored analogously to the first set of digital data which represent the payload data to be stored, for example. In contrast to the payload data, the second set of input data is, however, only provided to shroud the processing of the payload data in the circuit configuration. For this reason, the second set of input data are preferably not correlated to the payload data. The second set of input data may be supplied to the circuit configuration through an external unit, e.g., a source of (pseudo) random numbers or the like. It is also conceivable to derive the second set of input data from the payload data in such a way that it is difficult to predict, in particular with the aid of a deterministic process.

Alternatively to supplying the second set of input data via the second input, it may also be provided in another specific embodiment that a unit for generating the second set of digital input data is situated in the circuit configuration itself. In this case, a second input is not necessary, but instead the second set of input data may be generated locally in the circuit configuration, e.g., from the first set of input data (payload data) or also with the aid of a data source (noise source, (pseudo) random generator).

In one particularly advantageous specific embodiment, the circuit configuration is designed to carry out writing processes onto the register units simultaneously, in particular synchronously to the control signal, so that the logic state transitions of the individual register units or their components overlap, thus further increasing the level of protection.

In another specific embodiment, the writing processes onto the register units do not necessarily have to be carried out simultaneously. The utilization of the second set of digital input data rather already makes it possible to render cryptographic attacks more difficult, since it is made possible in this way to load in advance nontrivial data contents, for example, such as (pseudo) random numbers and the like, prior to writing the first set of input data, which is to be protected, into the register in a subsequent step. This makes it more difficult to trace the state changes of individual bit locations of the register.

In another particularly preferred specific embodiment, it is provided that the circuit configuration has a first multiplexer unit which may be acted on by the first and the second sets of input data, and which outputs at least parts of the first or of the second set of input data to the first register unit as a function of the control signal or of a signal derived from the control signal.

In another particularly preferred specific embodiment, it is provided that the circuit configuration has a second multiplexer unit which may be acted on by the first and the second sets of input data, and which outputs at least parts of the first or of the second set of input data to the second register unit as a function of the control signal or of a signal derived from the control signal.

In another particularly preferred specific embodiment, it is provided that the circuit configuration has a third multiplexer unit which may be acted on by an output signal of the first register unit and by an output signal of the second register unit and which is designed to output the output signal of the first register unit or the output signal of the second register unit, in particular to the output of the circuit configuration, as a function of the control signal or of a signal derived from the control signal.

In another particularly preferred specific embodiment, it is provided that a negated control signal is suppliable to the first and the third multiplexer units and the control signal is suppliable to the second multiplexer unit.

As another aspect of the present invention, a data register is provided, in particular for implementing a ShiftRows function according to the Advanced Encryption Standard (AES), the data register having at least one circuit configuration according to the present invention. This makes it possible to advantageously provide a data register which is particularly DPA hardened and which is preferably suitable for integration into cryptographic devices, such as encryption units, etc.

In another specific embodiment, the circuit configuration according to the present invention may be used to replace and/or supplement conventional data registers in order to harden them against DPA attacks. In addition to the utilization of the circuit configuration according to the present invention for the purpose of constructing registers for AES algorithms or parts thereof, the circuit configuration according to the present invention may generally be used to provide a DPA hardened register.

In another specific embodiment, the circuit configuration according to the present invention may be expanded to include control inputs such as "write enable" and/or "clear" and/or "set" in order to further increase the usability and the flexibility.

Other features, possible applications, and advantages of the present invention are derived from the following description of exemplary embodiments of the present invention, which are illustrated in the figures of the drawing. All features described or illustrated represent the object of the present invention alone or in any arbitrary combination, regardless of their recapitulation in the patent claims or their back-reference, and regardless of their wording in the description or illustration in the drawing.

DETAILED DESCRIPTION

Figure 1:
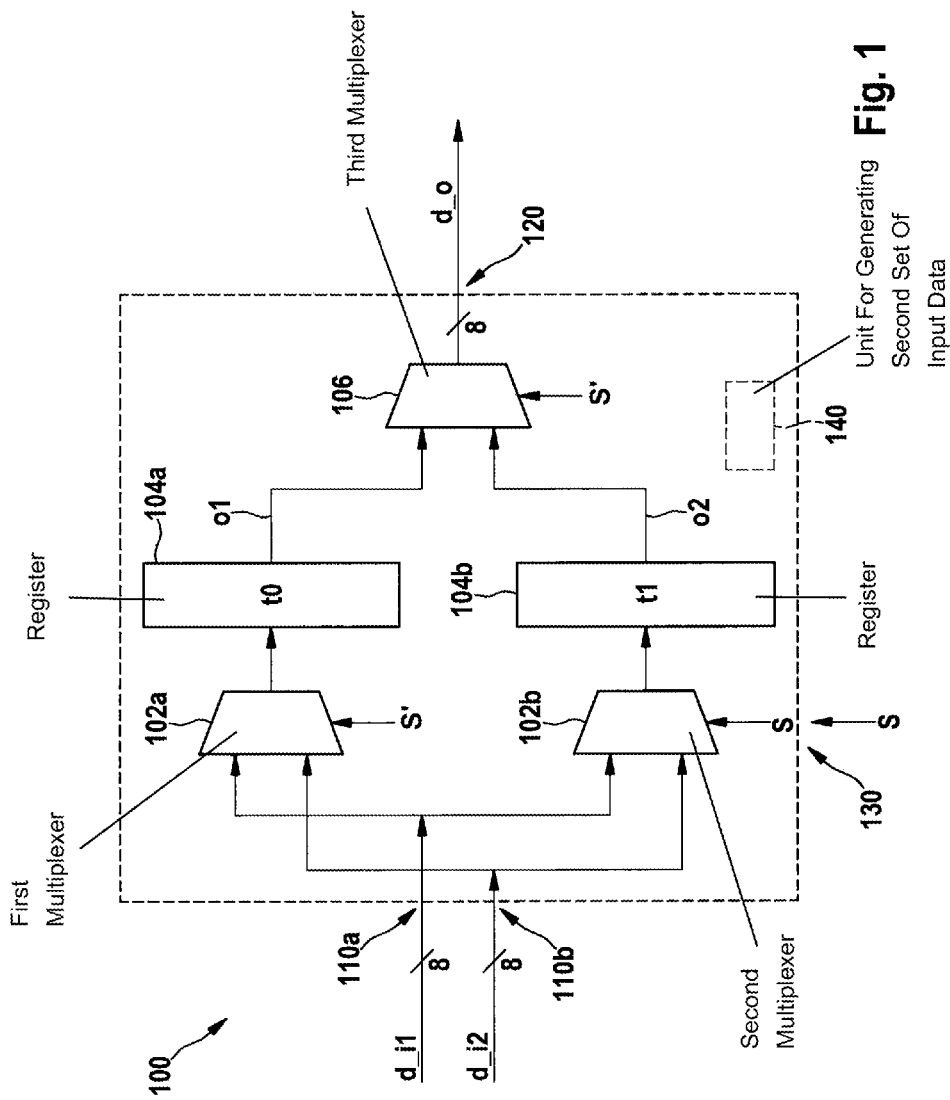
FIG. 1 schematically shows a circuit configuration according to one specific embodiment.

FIG. 1 schematically shows a circuit configuration according to the present invention according to one specific embodiment. Circuit configuration 100 has a first input 110a for inputting first set of digital input data d_i1. First set of digital input data d_i1 may have an arbitrary word width, in the present case 8 bits being assumed as an example. In general, word or data widths of 1 bit to 256 bits or more are conceivable. Circuit configuration 100 furthermore has a second input 110b for inputting second set of digital input data d_i2. As far as the data width is concerned, the same applies as mentioned above with regard to first set of digital input data d_i1. Input data d_i1, d_i2 may also have different bit widths.

As is apparent from FIG. 1, circuit configuration 100 also has a first multiplexer unit 102a which is connected on its input side to the two inputs 110a, 110b. In this way, it is possible to select in multiplexer unit 102a as a function of control signal s' which one of the input signals is output at the output of multiplexer unit 102a: a first input signal which corresponds to first set of input data d_i1 from the first input or a second input signal which corresponds to second set of input data d_i2 from the second input. This means that depending on the signal form of control signal s', one of the two input signals d_i1, d_i2 or at least parts thereof is/are output to register unit 104a which is situated downstream from first multiplexer unit 102a. The data width of the data path between components 102a, 104a preferably corresponds to the data width of input signals d_i1, d_i2.

As is also apparent from FIG. 1, circuit configuration 100 has a second multiplexer unit 102b which is connected on its input side to the two inputs 110a, 110b. In this way, it is possible to select in multiplexer unit 102b as a function of control signal s which one of the input signals is output at the output of multiplexer unit 102b: a first input signal which corresponds to first set of input data d_i1 from the first input or a second input signal which corresponds to second set of input data d_i2 from the second input. This means that depending on the signal form of control signal s, one of the two input signals d_i1, d_i2 or at least parts thereof is/are output to register unit 104b which is situated downstream from second multiplexer unit 102b. The data width of the data path between components 102b, 104b preferably corresponds to the data width of input signals d_i1, d_i2.

In one preferred specific embodiment, control signal s' for first multiplexer unit 102a corresponds to negated or inverted control signal s for second multiplexer unit 102b. In this way, it is advantageously ensured that the two multiplexer units 102a, 102b each output different input data or signals to register units 104a, 104b which are situated downstream from them. This means, in particular, that the same data will never be written into both register units 104a, 104b at the same time, thus resulting in an increased protection against DPA attacks.

In other words, during one writing cycle, data are written into both register units 104a, 104b according to one specific embodiment, one register unit receiving data which originate from input signal d_i1 and the other register unit receiving data which originate from input signal d_i2.

A third multiplexer unit 106 is connected to one output of each of register units 104a, 104b (data width, for example, again as in the case of input data, e.g., 8 bits) at its two inputs which are not denoted here in greater detail, so that output signals o1, o2 of register units 104a, 104b may be optionally output at the output of third multiplexer unit 106 as a function of control signal s' acting on multiplexer unit 106. As is apparent from FIG. 1, the output of multiplexer unit 106 is directly connected to an output 120 of circuit configuration 100, so that output signal d_o of circuit configuration 100 corresponds to the output signal of multiplexer unit 106.

Particularly preferably, multiplexer units 102a, 106 are controlled by the same control signal s' in the configuration described above, whereby it is advantageously ensured that data which correspond to first set of input data d_i1 are output at output 120 and not, for example, second set of input data d_i2 or an undefined combination of the two sets of input data d_i1, d_i2.

Nevertheless, the internal processing of input data d_i1, d_i2 advantageously takes place synchronously in circuit configuration 100, so that the logic states or state transitions which represent first input signal d_i1 are advantageously superimposed by those which are assigned to the second set of input data, whereby—independently of the technology used for the concrete implementation (e.g., CMOS)—the data processing of input data d_i1 is advantageously shrouded in the circuit configuration.

It is preferred that the second set of input data d_i2 is preferably not correlated to the payload data d_i1. Second set of input data d_i2 may be supplied to circuit configuration 100 through an external unit (not shown), e.g., through a source of (pseudo) random numbers or the like. It is also conceivable to derive second set of input data d_i2 from the payload data in a way which is difficult to predict.

Alternatively to supplying second set of input data d_i2 via second input 110b, it may also be provided in another specific embodiment that a unit 140 for generating second set of digital input data d_i2 is situated in circuit configuration 100 itself, cf. dashed rectangle 140 in FIG. 1. In this case, a second input 110b is not needed, but instead the second set of input data may be generated locally in circuit configuration 100, e.g., from the first set of input data (payload data) or also with the aid of a data source (noise source, (pseudo) random generator). In this case, unit 140 provides second set of input data d_i2 for both multiplexer units 102a, 102b.

Control signal s may be supplied to circuit configuration 100 via a separate input 130. Control signal s may be advantageously inverted internally in circuit configuration 100 to obtain both signals s, s' for the operation of circuit configuration 100 or of its components 102a, 102b, 106.

Figure 3:
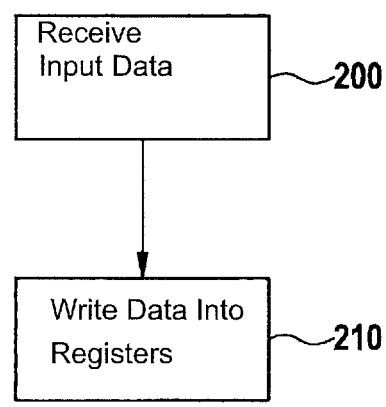
FIG. 3 shows a simplified flow chart of one specific embodiment of the method according to the present invention.

FIG. 3 shows a simplified flow chart of a specific embodiment of the method according to the present invention. In a first step 200, circuit configuration 100 (FIG. 1) receives both sets of digital input data d_i1, d_i2. In a subsequent step 210, received input data d_i1, d_i2 are written into register units 104a, 104b in a way as defined by multiplexer units 102a, 102b or their activation with the aid of signals s, s' and read out again by multiplexer unit 106, and output at output 120 of circuit configuration 100.

Figure 2:
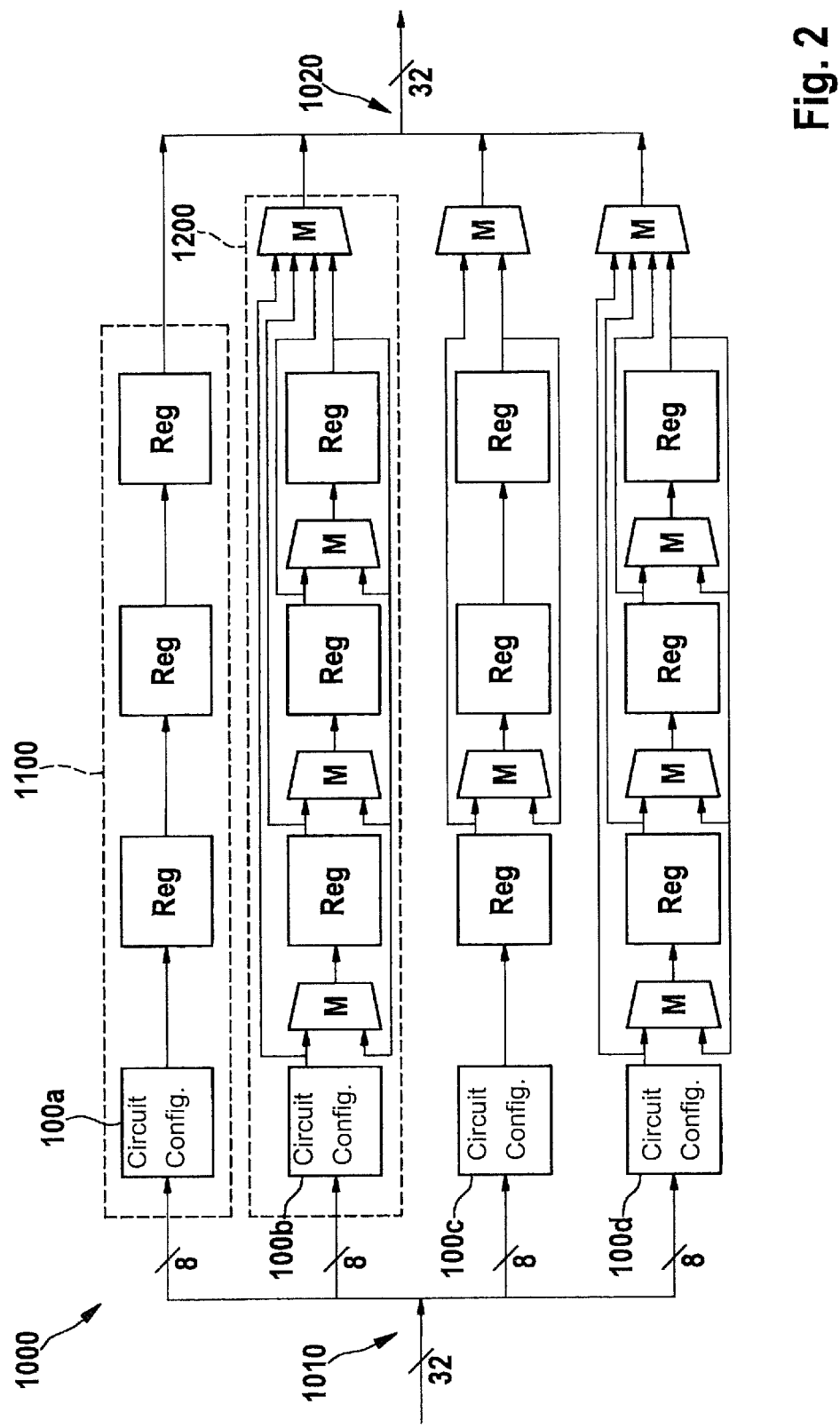
FIG. 2 schematically shows a data register according to one specific embodiment.

FIG. 2 shows a data register 1000 which is in particular designed to implement the ShiftRows function according to the Advanced Encryption Standard (AES). Information regarding AES is apparent from "Federal Information; Processing Standards Publication 197; Nov. 26, 2001; Announcing the ADVANCED ENCRYPTION STANDARD (AES)" and are retrievable on the Internet (World Wide Web) at "http://csrc.nist.gov/publications/fips/fips197/fips-197.pdf." Information regarding the ShiftRows function is included there in section 5.1.2, page 17.

Data register 1000 according to FIG. 2 has an input 1010 for inputting digital data, e.g., having a data width of 32 bits in the present case. Data register 1000 furthermore has an output 1020 having a data width of 32 bits for outputting digital data.

As is apparent from FIG. 2, the 32-bit wide input data are divided up into 8-bit words and supplied to circuit configurations 100a, 100b, 100c, 100d which are designed according to the present invention and each have a structure 100 according to FIG. 1, for example.

A first processing branch 1100 thus has a circuit configuration 100a which is designed according to the present invention as well as three conventional memory registers Reg which are designed identically to one another. This first processing branch 1100 thus implements the AES ShiftRows function described above for the first line of the document, quoted above, in the state as illustrated in FIG. 8.

A second processing branch 1200 has a circuit configuration 100b which is designed according to the present invention as well as three conventional memory registers Reg which are designed identically to one another and several multiplexers M. This second processing branch 1200 thus implements the AES ShiftRows function described above for the second line of the document, quoted above, in the state as illustrated in FIG. 8.

The other branches of structure 1000, which are not denoted in greater detail in FIG. 2, accordingly implement the AES ShiftRows function for the third and the fourth lines of the AES state.

The utilization of circuit configuration 100 or 100a through 100d according to the present invention for AES data register 1000 is particularly advantageous, since the protection of AES data register 1000 against DPA attacks is significantly increased thereby. Particularly advantageously, a significant DPA hardening is already achieved if four circuit configurations 100a, . . . , 100d according to the present invention are used, whereas other registers Reg are designed in a conventional manner.

Particularly advantageously, common multiplexers and/or flip-flop types (e.g., for the data registers)—such as the ones included in standard libraries for logic gates—may be used for the construction of the circuit configuration according to the present invention.

The circuit configuration according to the present invention may advantageously be used directly as a replacement for conventional registers in order to subject an arbitrary target system, which contained conventional registers so far, to a DPA hardening. In particular, conventional registers of arithmetic units (e.g., CPU registers) may also be replaced by the circuit configuration according to the present invention.

In another advantageous specific embodiment, a "write enable" control input may also be provided for the circuit configuration. In one preferred specific embodiment, both register units 104a, 104b may be written into when control input "write enable" is activated. Otherwise, the contents of register units 104a, 104b remain unchanged.

What is claimed is:

1. A circuit configuration, comprising:
a first input for inputting a first set of digital input data;
an output for outputting digital output data;
a control input for receiving a control signal; and
at least a first register unit and a second register unit, wherein:
the circuit configuration writes, as a function of the control signal, in the first register unit at least a part of one of the first set of input data and a second set of input data, and
the circuit configuration writes into the second register unit at least a part of one of the first set of input data and the second set of input data;
wherein the circuit configuration selects the digital output data from outputs of the first register unit and the second register unit, and wherein register unit outputs corresponding to the first set of input data are always selected over register unit outputs corresponding to the second set of input data.

2. The circuit configuration as recited in claim 1, further comprising at least one of:
a second input for inputting the second set of input data; and
a unit for generating the second set of input data.

3. The circuit configuration as recited in claim 1, wherein the circuit configuration carries out writing processes onto the first register unit and the second register unit simultaneously.

4. The circuit configuration as recited in claim 3, wherein the writing processes are carried out synchronously to the control signal.

5. The circuit configuration as recited in claim 1, further comprising:
a first multiplexer unit capable of being acted on by the first and the second sets of input data, the first multiplexer outputting at least parts of one of the first set of input data and the second set of input data to the first register unit as a function of one of the control signal and a signal derived from the control signal.

6. The circuit configuration as recited in claim 5, further comprising:
a second multiplexer unit capable of being acted on by the first and the second sets of input data, the second multiplexer outputting at least parts of one of the first set of input data and the second set of input data to the second register unit as a function of one of the control signal and the signal derived from the control signal.

7. The circuit configuration as recited in claim 6, further comprising:
a third multiplexer unit capable of being acted on by an output signal of the first register unit and by an output signal of the second register unit, the third multiplexer outputting the one of the output signal of the first register unit and the output signal of the second register unit as a function of one of the control signal and the signal derived from the control signal.

8. The circuit configuration as recited in claim 7, wherein the third multiplexer outputs the one of the output signal of the first register and the output signal of the second register to the output of the circuit configuration.

9. The circuit configuration as recited in claim 7, wherein the signal derived from the control signal is a negated control signal suppliable to the first multiplexer unit and the third multiplexer unit, and wherein the control signal is suppliable to the second multiplexer unit.

10. The circuit configuration as recited in claim 1, wherein the second set of digital input data is uncorrelated to the first set of digital input data.

11. The circuit configuration as recited in claim 10, wherein the second set of digital input data is generated by a noise, random or pseudo random generator.

12. The circuit configuration as recited in claim 10, wherein the second set of digital input data is generated locally at the circuit configuration from the first set of digital input data.

13. A data register, comprising:
   at least one circuit configuration that includes:
      a first input for inputting a first set of digital input data;
      an output for outputting digital output data;
      a control input for receiving a control signal; and
      at least a first register unit and a second register unit, wherein:
         the circuit configuration writes, as a function of the control signal, in the first register unit at least a part of one of the first set of input data and a second set of input data, and
         the circuit configuration writes into the second register unit at least a part of one of the first set of input data and the second set of input data;
      wherein the circuit configuration selects the digital output data from outputs of the first register unit and the second register unit, and wherein register unit outputs corresponding to the first set of input data are always selected over register unit outputs corresponding to the second set of input data.

14. The data register as recited in claim 13, wherein the data register is for implementing a ShiftRows function according to an Advanced Encryption Standard.

15. A method for operating a circuit configuration including a first input for inputting a first set of digital input data, an output for outputting digital output data, and a control input for receiving a control signal, wherein at least two register units are provided, the method comprising:
   writing, as a function of the control signal, into a first register unit at least a part of one of the first set of input data and a second set of input data;
   writing into a second register unit at least a part of one of the first set of input data and the second set of input data; and
   selecting the digital output data from outputs of the first register unit and the second register unit, and wherein register unit outputs corresponding to the first set of input data are always selected over register unit outputs corresponding to the second set of input data.

* * * * *